United States Patent

Luther

[11] Patent Number: 5,555,343
[45] Date of Patent: Sep. 10, 1996

[54] TEXT PARSER FOR USE WITH A TEXT-TO-SPEECH CONVERTER

[75] Inventor: Willis J. Luther, Irvine, Calif.

[73] Assignee: Canon Information Systems, Inc., Costa Mesa, Calif.

[21] Appl. No.: 418,872

[22] Filed: Apr. 7, 1995

Related U.S. Application Data

[63] Continuation of Ser. No. 978,487, Nov. 18, 1992, abandoned.

[51] Int. Cl.⁶ .................................................. G10L 9/00
[52] U.S. Cl. ........................... 395/269; 395/2.67; 395/2.76
[58] Field of Search ........................... 395/2, 2.67, 2.69, 395/2.7, 2.76, 2.77; 381/52, 53

[56] References Cited

U.S. PATENT DOCUMENTS

| | | | |
|---|---|---|---|
| 3,704,345 | 11/1972 | Coker et al. | 395/2.69 |
| 4,692,941 | 9/1987 | Jacks et al. | 381/52 |
| 4,788,649 | 11/1988 | Shea et al. | 395/2.76 |
| 4,872,202 | 10/1989 | Fette | 395/2.69 |
| 4,996,707 | 2/1991 | O'Malley et al. | 379/100 |
| 5,010,495 | 4/1991 | Willetts | 395/2 |
| 5,091,931 | 2/1992 | Milewski | 379/100 |
| 5,127,047 | 6/1992 | Bell et al. | 379/100 |
| 5,157,759 | 10/1992 | Bachenko | 395/2.69 |
| 5,163,081 | 11/1992 | Wycherley et al. | 379/52 |
| 5,212,731 | 5/1993 | Zimmermann | 395/2.69 |
| 5,463,713 | 10/1995 | Hasegawa | 395/2.69 |

FOREIGN PATENT DOCUMENTS

| | | |
|---|---|---|
| 095069 | 11/1983 | European Pat. Off. . |
| 200389 | 11/1986 | European Pat. Off. . |
| 405029 | 1/1991 | European Pat. Off. . |

*Primary Examiner*—Allen R. MacDonald
*Assistant Examiner*—Michael A. Sartori
*Attorney, Agent, or Firm*—Fitzpatrick, Cella, Harper & Scinto

[57] ABSTRACT

A text parser for a text-to-speech processor accepts a text stream and parses the text stream to detect non-spoken characters and spoken characters. The spoken characters are passed to the text-to-speech converter and are not altered. A text generator generates pre-designated text sequences in response to non-spoken characters, such as special character sequences or character sequences which match format templates. A speech command generator generates speech commands in response to detecting of non-spoken characters such as non-spoken characters which affect text style, font, underlining, etc. The text-to-speech converter converts spoken text parsed by the parser and text generated by the text generator into speech, the text-to-speech converter being operable in response to speech commands generated by the speech command generator. According to the invention, it is not necessary to pre-process text files in preparation for text-to-speech conversion, and arbitrary files which contain both spoken and non-spoken characters may be converted easily.

82 Claims, 5 Drawing Sheets

| MARK-UP CODE | GENERATED TEXT | SPEECH COMMAND |
|---|---|---|
| &B | "BOLD" | (loud volume) (slow speed) |
| &I | "ITALICS" | (loud volume) (medium speed) |
| &U | "UNDERLINE" | |

| FORMAT TEMPLATE | GENERATED TEXT |
|---|---|
| [F1] : \ [F2] \ [F3] | {low volume} "COMPUTER FILE DESIGNATION:" {medium volume} "DRIVE" [F1] "," [F2] "DIRECTORY," [F3] "FILE" |
| [F1] : [F2] : [F3] | [F1] "HOURS," [F2] "MINUTES, AND" [F3] "SECONDS" |

| PUNCTUATION | GENERATED TEXT | SPEECH COMMAND |
|---|---|---|
| "!" | "EXCLAMATION" | {high pitch} |
| "+" | "PLUS" | {no change} |

| HEX CODE | ASCII CHARACTER |
|---|---|
| 20 | "a" |
| 21 | "b" |
| 22 | "c" |

FIG. 4(a)

| MARK-UP CODE | GENERATED TEXT | SPEECH COMMAND |
|---|---|---|
| &B | "BOLD" | (loud volume) (slow speed) |
| &I | "ITALICS" | (loud volume) (medium speed) |
| &U | "UNDERLINE" | |

FIG. 4(b)

| FORMAT TEMPLATE | GENERATED TEXT |
|---|---|
| [F1] : \ [F2] \ [F3] | {low volume} "COMPUTER FILE DESIGNATION:" {medium volume} "DRIVE" [F1] "," [F2] "DIRECTORY," [F3] "FILE" |
| [F1] : [F2] : [F3] | [F1] "HOURS," [F2] "MINUTES, AND" [F3] "SECONDS" |

FIG. 4(c)

| PUNCTUATION | GENERATED TEXT | SPEECH COMMAND |
|---|---|---|
| "!" | "EXCLAMATION" | {high pitch} |
| "+" | "PLUS" | {no change} |

FIG. 4(d)

TEXT PARSER FOR USE WITH A TEXT-TO-SPEECH CONVERTER

This application is a continuation, of application Ser. No. 07/978,487 filed Nov. 18, 1992, now abandoned.

BACKGROUND OF THE INVENTION

1. Field Of The Invention

The present invention relates to a parser for text that is to be subjected to text-to-speech processing, and particularly to such a parser which detects non-spoken characters and which replaces those characters with spoken text-equivalent characters or which generates speech commands based on the non-spoken characters.

2. Description Of The Related Art

Recently, as the technology for electronically converting text-to-speech has advanced, direct text-to-speech conversion is replacing other techniques where computer generated speech is desired, for example, digitized speech techniques in which spoken words are digitized by high speed analog-to-digital sampling and the digitized words are stored for selective play out. In comparison to direct text-to-speech, however, digital speech techniques consume large amounts of memory because a different storage location is needed for each one of the high speed digital samples. Direct text-to-speech techniques, on the other hand, need only store ASCII text, and consequently those direct text-to-speech techniques need only about b $\frac{1}{1000}$ of the memory needed by digitized speech techniques.

Moreover, digitized speech techniques are unsuitable for many applications where computer generated speech is needed. Digitized speech does not work when original audio signals are not available, for example, when it is desired to "speak" an incoming facsimile. Direct text-to-speech, on the other hand, can perform optical character recognition on the incoming facsimile message and channel the text which results from optical character recognition processing to a text-to-speech converter, whereby an incoming facsimile message may be spoken.

Despite the desirability of direct text-to-speech, conventional text-to-speech processes have only limited ability to adapt to the format of an incoming text stream. For example, an incoming text stream often contains characters that are not part of the message being communicated, such as new paragraph marks, printer control characters, and other "non-spoken" characters. Conventional text-to-speech processors attempt to speak each and every character that is fed to it, including the non-spoken characters embedded in the text, which results in garbled speech. Moreover, there has not been provisions to automatically vary the intonation of text-to-speech processors based on the context of the text. This results in monotonous sequences of monotone speech.

Accordingly, it has heretofore not been possible to send arbitrary text files to a text-to-speech converter. Rather, it has been necessary to manually edit text files before text-to-speech processing so as to remove non-spoken characters and so as to insert speech commands (for example, loud, soft, fast or slow) so as to break monotony.

SUMMARY OF THE INVENTION

It is an object of the present invention to address the foregoing difficulties.

In one aspect, the invention is a text parser which parses the text fed to a text-to-speech converter so as to detect non-spoken characters. Any non-spoken characters that are detected are subjected to analysis. If the non-spoken characters match any one of a set of first characteristics, such as non-spoken characters that designate the position and paragraphing of text on a page or non-spoken character sequences having pre-designated formats, then the non-spoken characters are replaced by pre-designated text sequences that correspond to the non-spoken characters. If the non-spoken characters match any one of a set of second characteristics, such as non-spoken characters that indicate the typeface, font, underlining or boldness of succeeding text, then those non-spoken characters are deleted and replaced with speech commands which cause a text-to-speech converter to vary intonation, speaking speed, etc.

The characteristics of non-spoken characters are determined in accordance with stored tables of characteristics. The tables contain formatting information and rules for dealing with the different aspects of non-spoken characters. A first table contains a list of unprintable or non-spoken characters. A second table contains a list of mark-up codes by which conventional word processing programs designate text style (for example, bold, italics, etc.) fonts, underlining, etc. Another table stores a list of non-spoken characters such as exclamation points, mathematical symbols, etc. that are to be replaced by text-equivalent spoken characters. Yet another table stores format templates for converting specially formatted strings such as dates, times, and DOS path names into speakable text-equivalent strings. Yet another table interprets the spatial relationship of text within a printed page (for example, titles, captions for figures, paragraphing, etc.) to identify and assign user specifiable changes in speech commands (intonation, etc.) and to insert user-specifiable legends.

The text stream input to the parser may be obtained from a variety of sources. For example, the text stream may be obtained from word processing files which ordinarily contain significant numbers of non-spoken characters that designate paper size, font, underlining, spacing, etc. Likewise, the input text may be obtained from electronic mail on a local area network, or it may be downloaded from an electronic bulletin board via a modem. Finally, it is possible to obtain input text files by subjecting input facsimile messages to optical character recognition processing and storing the resulting text for pre-parsing and text-to-speech conversion.

This brief summary has been provided so that the nature of the invention may be understood quickly. A more complete understanding of the invention can be obtained by reference to the following detailed description of the preferred embodiment thereof in connection with the drawings which together form a complete part of the specification.

BRIEF DESCRIPTION OF THE DRAWINGS

FIG. 4(a) through 4(d) are representative reference tables by which parsing of non-spoken characters is conducted.

DETAILED DESCRIPTION OF THE PREFERRED EMBODIMENT

Figure 1:
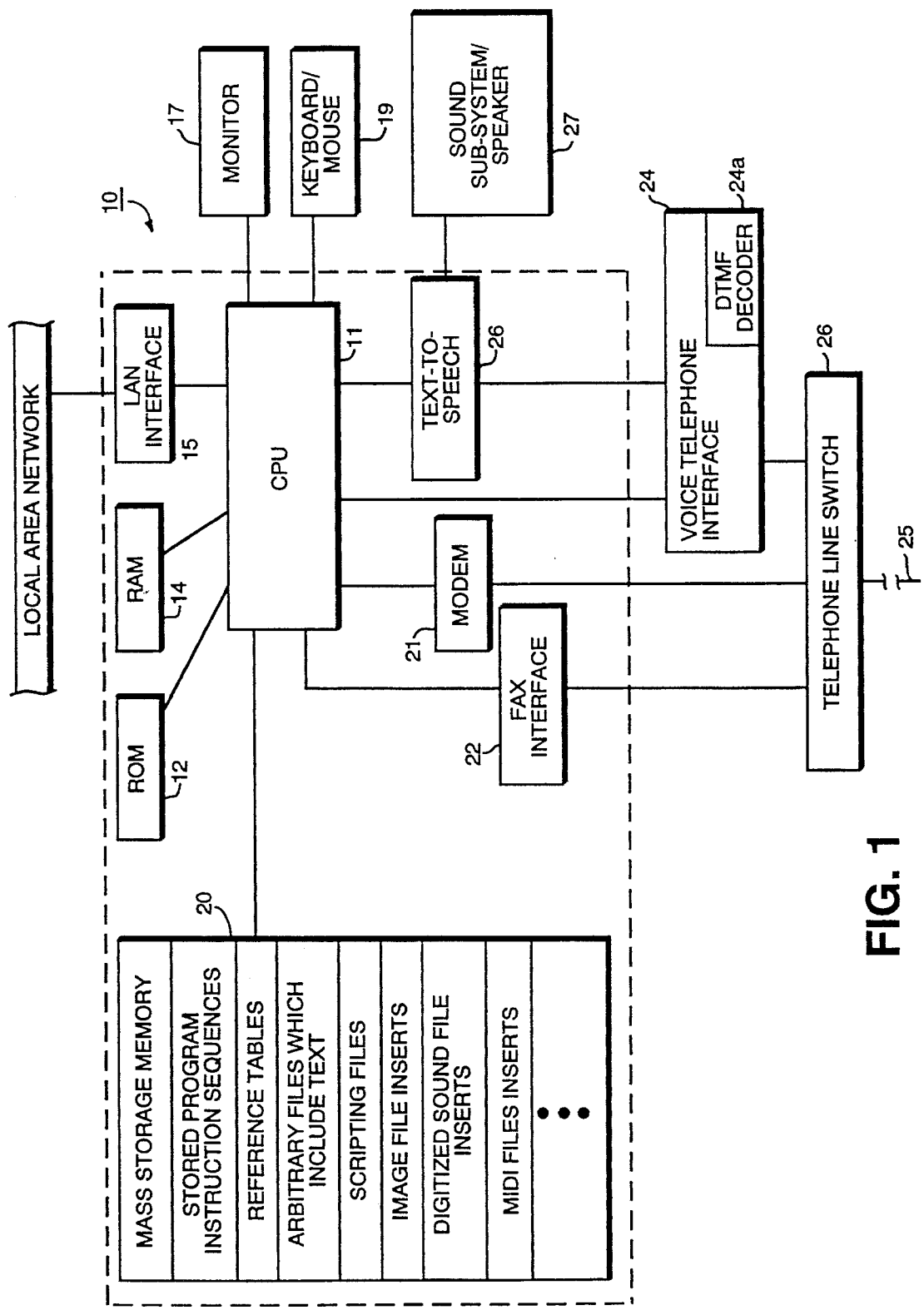
FIG. 1 is a block diagram showing an apparatus according to the invention.

FIG. 1 is a schematic block diagram of an apparatus according to the invention.

In FIG. 1, reference numeral 10 designates personal computing equipment such as an IBM PC or PC-compatible computer. Computing equipment 10 includes a CPU 11 such as an 80386 processor which executes stored program instructions such as operator-selected applications programs that are stored in ROM 12 or specialized functions such as start-up programs which are stored in RAM 14. Computing equipment 10 further includes a local area network interface device 15 which provides access to a local area network 16 whereby the computing equipment can access files on a remote file server or send files for remote printing or otherwise interact with a local area network in accordance with known techniques such as by sending or receiving electronic mail.

Computing equipment 10 further includes a monitor 17 for displaying graphic images and a keyboard/mouse 19 for allowing operator designation and inputting functions.

Mass storage memory 20, such as a fixed disk or a floppy disk drive is connected for access by CPU 11. Mass storage memory 20 typically includes stored program instructions sequences such as an instruction sequence for text parsing according to the invention, or other application programs such as word processing application programs, optical character recognition programs, spread sheet application programs, and other information and data processing programs. Mass storage memory 20 further stores reference tables for use by the text parser of the invention, as well as arbitrary files which include text that are to be processed by text-to-speech conversion, scripting files which control a text-to-speech narration process, image files which are inserted by the scripting files, digitized sound files which are inserted by the scripting files and MIDI files which are inserted by the scripting files. Other data may be stored on mass storage memory 20 as designated by the operator.

A modem 21, a facsimile interface 22, and a voice telephone interface 24 are provided so that CPU 11 can interface to an ordinary telephone line 25. Each of the modem 21, facsimile interface 22, and voice telephone interface 24 are given access to the telephone line 25 via a telephone line switch 26 which is activated under control by CPU 11 so as to connect the telephone line 25 to one of the modem 21, the facsimile 22 or the voice telephone interface 24, as appropriate to the data on the telephone line. Thus, CPU 11 can send and receive binary data such as ASCII text files via modem 21, it can send and receive facsimile messages via facsimile interface 22, and it can interact on ordinary voice telephone lines via voice telephone interface 24. In this regard, voice telephone interface 24 is provided with a DTMF decoder so as to decode tones on voice telephone which correspond to operator depressions of a telephone keypad. The decoded tones are interpreted by CPU 11 as operator commands in accordance with program instructions stored in mass storage memory 20.

A conventional text-to-speech converter 26 is connected to CPU 11. The text-to-speech converter 26 interprets text strings sent to it and converts those text strings to audio speech information. The text-to-speech converter 26 provides the audio speech information either to a speaker 27 for enunciation to a local computer operator, or provides the audio speech information to the voice telephone interface 24 for enunciation over ordinary voice telephone lines.

Figure 2:
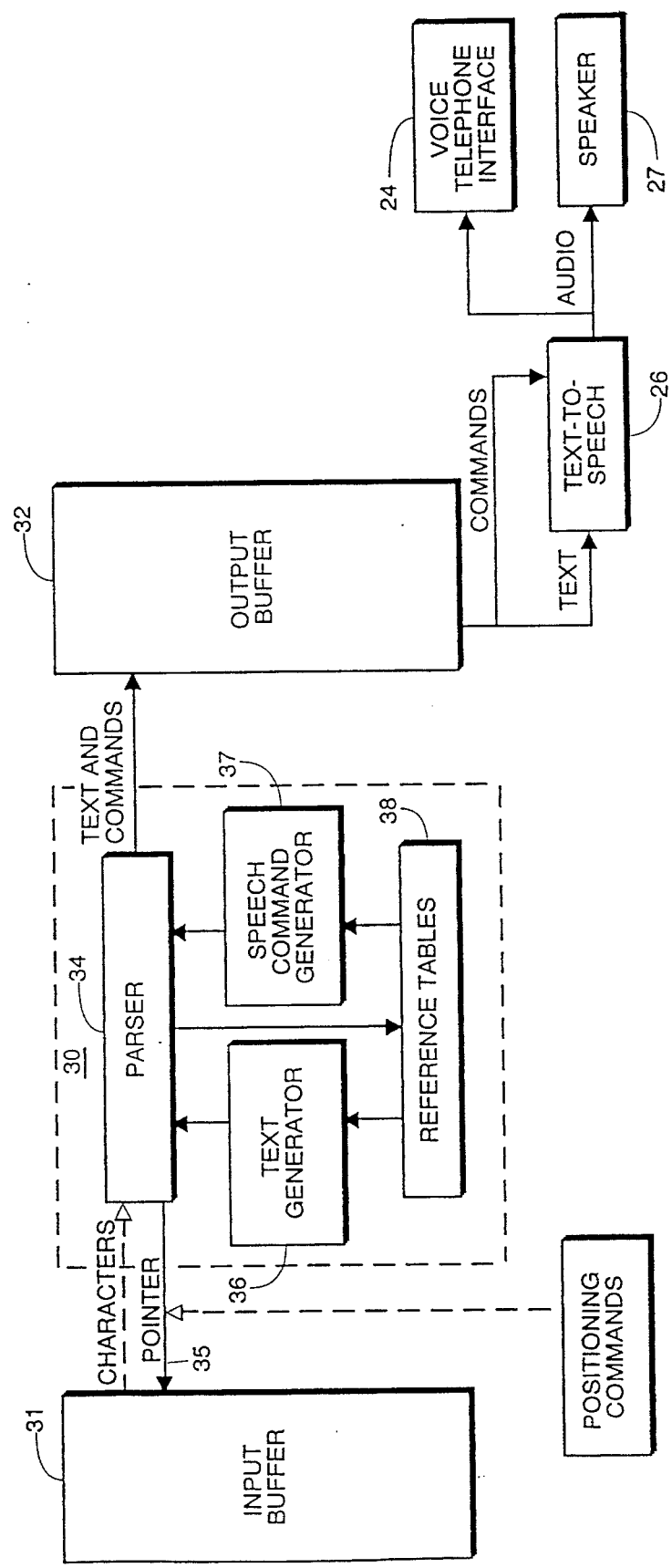
FIG. 2 is a functional block diagram for explaining text parsing.

FIG. 2 is a functional block diagram for explaining the operation of the FIG. 1 apparatus. In FIG. 2, 30 is a text parser for parsing text stored in input buffer 31 and for storing parsed text in output buffer 32. The parsed text in output buffer 32 is spoken by text-to-speech converter 26 over voice telephone interface 24 or over speaker 27 as explained above.

Text parser 30 is implemented in accordance with a stored program instruction sequence stored in mass storage memory 20 and executed by CPU 11. Typically, the stored program instruction steps are stored in RAM 14 and executed out of RAM. Likewise, input buffer 31 and output buffer 32 are stored in other locations in RAM 14.

The text that is stored in input buffer 31 and which is parsed by text parser 30 may be provided from a variety of text sources. For example, the text may be generated by word processing programs which have been executed by CPU 11 and which stores the resulting word processed files in mass storage memory. The text may also be obtained by similarly processed word processed files which are accessed from a file server across local area network 16. Or, the text may be obtained from electronic mail messages which are sent and received to users in the local area network over the local area network 16. The text files may also be obtained in binary format, for example, ASCII, from modem 21 via telephone line 25 and telephone line switch 26. Such binary data is often associated with computerized bulletin boards and are downloaded by CPU 11 in accordance with stored program instruction sequences.

The text file may also be obtained by optical character recognition processing of a facsimile document that is received from telephone line 25 via facsimile interface 22. In accordance with conventional technology, facsimile images that are received from facsimile interface 22 are converted by CPU 11 into bit map images and the bit map images are subjected to optical character recognition processing. The text files that result from optical character recognition processing may be stored in mass storage memory 20 and thereupon provided to input buffer 31, or may be provided directly to input buffer 31.

In FIG. 2, text parser 30 includes a parser 34 which maintains a pointer 35 to characters in input buffer 31. Based on the position of that pointer, characters are provided to parser 34. Parser 34 inspects those characters to detect non-spoken characters. Spoken characters are provided directly to output buffer 32 for enunciation by text-to-speech converter 26. Non-spoken characters are determined by reference to one of reference tables 38, the contents of which will be discussed more fully with respect to FIG. 4. For non-spoken characters, parser 34 inspects those characters with respect to reference tables 35 to determine whether they have certain characteristics. For example, if parser 34 determines that the non-spoken characters correspond to certain pre-designated character sequences, such as punctuation marks or mathematical symbols, then text generator 36 generates text-equivalent sequences in replacement for those non-spoken characters. If, on the other hand, parser 34 determines that the non-spoken characters correspond to certain escape sequences which control text font, style, underlining, appearance, etc. then speech command generator 37 generates speech commands which alter the manner in which text-to-speech converter 26 enunciates the speech. For example, via commands generated by speech command generator 37, the text-to-speech converter 26 can modify speed, pitch (frequency), volume, stress or voice.

In FIG. 2, text and speech commands are provided serially to the output buffer whereupon text-to-speech converter 26 sequentially and serially processes the text and embedded speech commands so as to extract the speech commands from the text. This arrangement is preferable, because since the speech commands are embedded in the text, it is not possible to lose synchronization between text and the speech commands associated with that text. On the other hand, when speech commands are not embedded in text then it is possible to lose synchronization between text and the associated commands because the commands and text are processed by the text-to-speech converter 26 separately.

It is also preferable for the parser 34 not simply to read the input buffer 31 from beginning to end but rather to provide for control over pointer 35 which points to text in the buffer. As shown in FIG. 2, CPU 11 preferably provides for pointer positioning commands which allow operator interface and control over the sequence by which the input buffer is provided. For example, in accordance with operator input from keyboard 19, CPU 11 may re-position pointer 35 so as to repeat text strings in the input buffer, or so as to backspace or fast forward through the input buffer. Likewise, it is possible for an operator to indicate that only certain portions should be parsed. For example, an operator may designate that only the first sentence of each paragraph be spoken, or, in the case of electronic mail, that only header information such as sender and subject be spoken.

Similar control over the position of pointer 35 in input buffer 31 may also be provided for remote users via telephone interface 24. In this case, a remote user may designate text play out commands by depressing selected keys on a touch telephone dial pad. The resulting DTMF tones are decoded by DTMF decoder 24a and provided to CPU 11 via the voice telephone interface 24. CPU 11 can interpret those DTMF commands and re-position the pointer in response to those commands in much the same manner as commands entered by local users through keyboard/mouse 19. Suitable techniques are discussed in my co-pending U.S. patent applications Ser. Nos. 07/977,680, filed Nov. 18, 1992, and 07/978,440, filed Nov. 18, 1992, respectively entitled "Graphics User Interface For Controlling Text-To-Speech Conversion" and "Method And Apparatus For Extracting Text From A Structured Data File And Converting The Extracted Text To Speech", the contents of which are incorporated herein by reference as if set forth here in full.

Figure 3A:
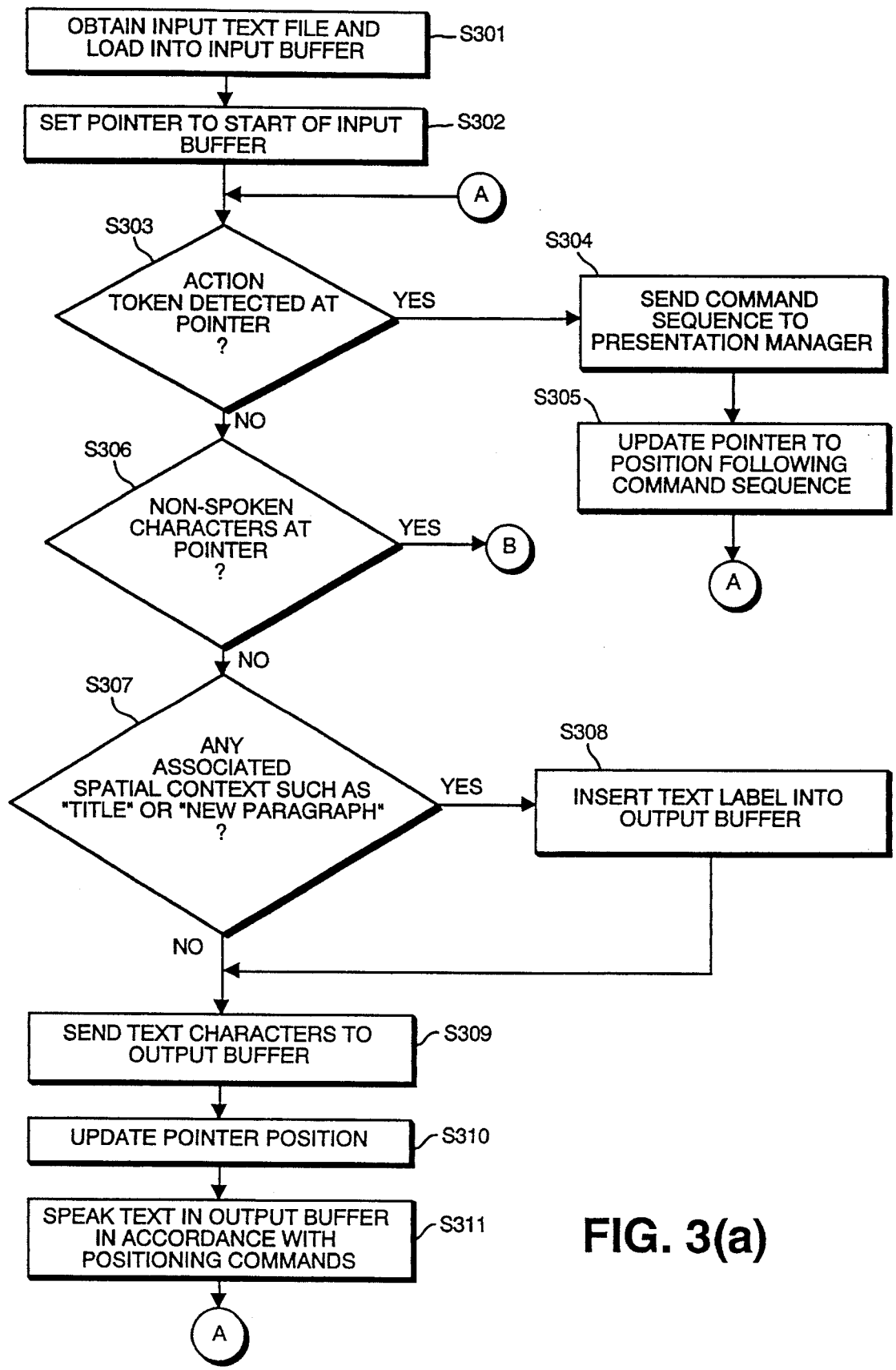
FIGS. 3(a) 3(b), and 3(c) is a flow diagram for explaining text parsing according to the invention.
Figures 3B, 3C:
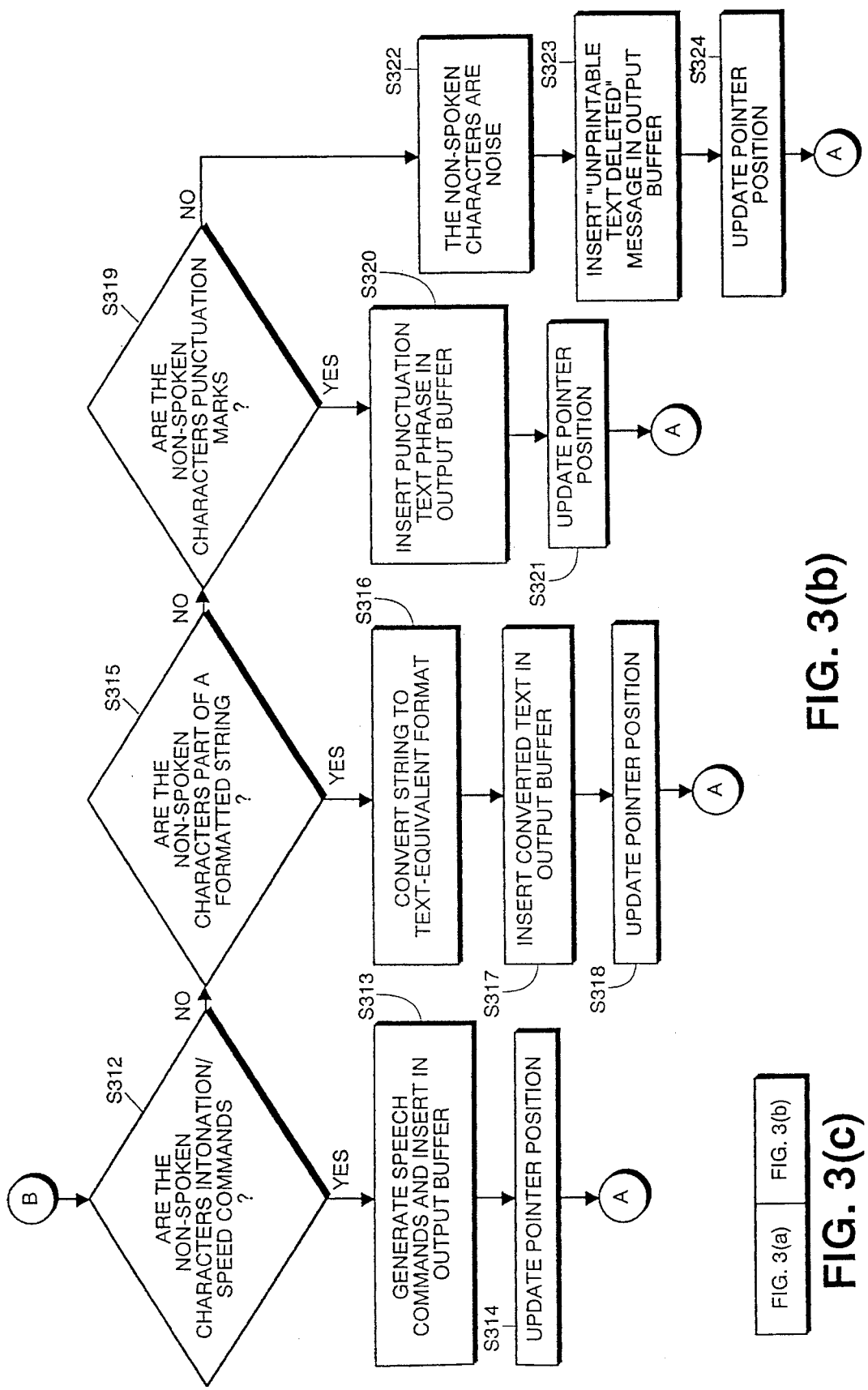

FIG. 3 is a detailed flow diagram showing operation of the present invention.

In step S301, an input text file is obtained and loaded into input buffer 31. As mentioned above, the input text file can be obtained from any of a variety of sources, such as a word processing text file, a DOS text file, electronic mail, etc.

In step S302, parser 34 sets pointer 35 to the beginning of the input buffer 31. Characters are provided to parser 34 from the pointer's position. In step S303, the characters provided to the parser are inspected to determine if an action token has been detected at the position of pointer 35. An "action token" refers to as a special character, such as a vertical bar ("|") by which a scripting program which includes text narration to be converted into speech can command certain actions to be taken, such as commanding an image file to be inserted onto a monitor, commanding digitized sound to be played over a speaker, commanding MIDI music to be played, etc. Scripting is described in my co-pending U.S. patent application Ser. No. 07/978,336, filed Nov. 18, 1992, entitled "Method And Apparatus For Scripting A Text To-Speech-Based Multimedia Presentation", the contents of which are incorporated herein by reference as if set forth in full.

If in step S303 an action token has been detected, then in step S304, the command sequence which follows the action token is sent to a presentation manager for execution. The position of pointer 35 is updated in step S305 to the position in input buffer 31 which immediately follows the command sequence, and flow returns to step S303 for inspection of the characters at the new pointer position.

If in step S303 an action token is not detected, then flow advances to step S306 which determines whether the pointer points to an non-spoken character. Non-spoken characters are determined by reference to one of reference tables 38, such as the table illustrated in FIG. 4(a). As shown in that figure, the table includes only spoken characters such as those characters between hexadecimal codes 20H through 7EH. The table is user-modifiable, so that other spoken codes can be added to the table, for example, when special characters for European accents may be present in the text. For example, certain spoken codes can include an accented lower case e ("é") whose hexadecimal code is 8Ah.

If an non-spoken character is not detected at the pointer, then step S307 determines whether there is any associated spatial context with the character. For example, when it is desired to convert a text file which includes the text for a form organized into title fields, the position of those fields is an associated spatial context to the text. Thus, the position of the field may indicate a title or the position of the field may indicate a social security number or the position of the field may indicate a name, etc. If there is any associated spatial context with the field, then flow advances to step S308 in which a text label for that field is inserted into output buffer 32. Thus, if the spatial context of the field indicates that the text in input buffer 31 is a social security number, then step S308 inserts the text "social security number" into output buffer 32.

In either event, flow advances to step S309 in which the text characters at the position of pointer 35 in input buffer 31 are sent to output buffer 32. The position of pointer 35 in the output buffer 31 is updated (step S310) and flow thereupon returns to step S303 for inspection of the characters at the new pointer position.

Meanwhile, in step S311, text-to-speech converter 26 obtains text from output buffer 32 and converts the text into speech for enunciation by speaker 27 or voice telephone interface 24. It is to be understood that the speaking step shown in step S311 occurs concurrently and independently of the steps which load text and speech commands into output buffer 32. The inclusion of step S311 in FIG. 3 is for illustrative purposes only and is not to be construed as an indication of sequential operation.

Reverting to step S306, if that step determines that there are non-spoken characters at the position of pointer 35 then flow advances to step S312 which determined whether the non-spoken characters are associated with intonation and/or speed commands. The determination in step S312 is made by reference to one of reference tables 38, such as the tables shown in FIG. 4(b). As shown in that table, the non-spoken characters at the proper position are compared to mark-up codes which are conventionally used by word processing programs to indicate that a different style is to be used for the succeeding text. For example, a mark-up code "&B" may indicate that the succeeding text is to be printed in bold letters, and a mark-up code "&I" may indicate that the succeeding text is to be printed in italics. If by reference to the table in FIG. 4(b) step S312 determines that the non-spoken characters correspond to mark-up codes, then flow advances to step S313 in which speech commands are obtained from the table and used by speech command generator to insert a speech command into the output buffer 32. For example, if a mark-up code for bold text is detected in step S312, then a speech command for increased emphasis, such as {loud volume} {slow speed} may be inserted into output buffer 32 by speech command generator 37. Likewise, different styles generate different speech commands for different emphasis as set forth in the table.

The table in FIG. 4(b) also shows generated text associated with mark-up codes. If desired, it is possible for step S313 also to cause text generator 36 to insert an enunciation of the mark-up code into the output buffer so that the listener may understand fully that the mark-up code has been encountered in the input buffer 31.

In step S314, the position of pointer 35 is updated to a position after the mark-up code. Flow then returns to step S303 for inspection of the characters at the new pointer position.

If in step S312 the non-spoken characters are not associated with intonation and/or speed commands, then flow advances to step S315 in which parser 34 inspects the non-spoken characters to determine whether they form part of a formatted string of characters. The determination in step S315 is made by reference to one of the reference tables 38, such as the table shown in FIG. 4(c).

As shown in FIG. 4(c), the table includes format templates which comprise wild card fields, for example "[F1]", as well as format data such as ":" and "\". If parser 34 determines in step S315 that the character string beginning at the position of pointer 35 matches the format of one of the format templates in the reference table of FIG. 4(c), then text generator 36 generates the associated text. Format templates may be provided for several different formats such as computer file designation formats, dates, time-of-day, etc. The format templates illustrated in FIG. 4(c) are for computer file designation formats and time-of-day formats. Thus, for example, if the character string beginning at the position of pointer 35 is "D:\media\images.tif", then parser 34 will determine in step S315 that the character string matches the format template for a computer file designation which is the first entry in the table of FIG. 4(c). In this example, [F1]="D", [F2]="media", and [F3]="images.tif". Then, in step S316, the character string is converted into a text-equivalent format in accordance with the generated text entry from the table. Thus, in this example, text generator 36 generates the following text: "computer file designation: drive D, media directory, images.tif file". The text generated by text generator 36 is inserted into the output buffer 32 (step S317).

The table shown in FIG. 4(c) may also include speech commands such as {low volume}, etc. so as to place emphasis where important. If speech commands are present then speech command generator 37 generates the needed speech commands and inserts them in the proper sequence with text into output buffer 32. In the foregoing example, speech commands are generated so that "computer text file designation" is spoken with a lower volume than the remainder of the character string.

In any event, in step S318, the position of pointer 35 is updated to the position next succeeding the character string that was converted to text-equivalent format and flow returns to step S303 for inspection of the characters at the new pointer position.

If in step S315 the non-spoken characters at the pointer position are not part of a formatted string, then flow advances to step S319 where parser 34 determines whether the non-spoken characters are non-spoken punctuation marks. Parser 34 makes this determination by reference to one of reference tables 38, such as the reference table shown in FIG. 4(d). As seen there, each punctuation mark or other non-spoken symbol such as arithmetic symbols is associated with a text phrase which is generated by text generator 36 and inserted into output buffer 32 (step S320). If desired, a speech command may also be stored in the reference table. If present, the speech command is used by speech command generator 37 and is inserted into the appropriate position of output buffer 32.

If in step S319 parser 34 does not determine that the non-spoken characters are punctuation marks, then in step S322, parser 34 concludes that the non-spoken characters are simply "noise" characters that should be deleted. For this purpose, parser 34 preferably examines adjacent characters so that even one or two or three spoken characters that are positioned between non-spoken characters are also determined to be "noise". Examining adjacent characters ensures that characters which are not meant to be spoken but which by chance are speakable, such as the letter "C" embedded in a sequence of non-spoken escape characters, are not inadvertently spoken.

In step S323, text generator 36 generates "unprintable text deleted" and inserts that text in output buffer 32 so that it is enunciated as a message to the user by text-to-speech converter 26. In step S324, the noise characters are skipped by updating the position of pointer 35 past the end of the noise characters.

What is claimed is:

1. A text processor for a text-to-speech converter comprising:

a parser for accepting a text stream, for parsing the text stream to detect an unspoken character having a first characteristic, an unspoken character having a second characteristic, and spoken characters, and for not altering the spoken characters in the text stream;

a text generator, responsive to detection of an unspoken character having the first characteristic, for generating a pre-designated text sequence, and for replacing, in the text stream, said unspoken character having said first characteristic with said pre-designated text sequence; and a speech command generator, responsive to detection of an unspoken character having a second characteristic, for generating pre-designated speech commands.

2. A text processor according to claim 1, further comprising a look-up table of spoken characters, wherein said parser detects unspoken characters by reference to said look-up table.

3. A text processor according to claim 1, wherein said parser includes a pointer for pointing to an input position in an input character buffer, said text stream comprising characters pointed to by said pointer.

4. A text processor according to claim 1, further comprising a look-up table, wherein the first characteristic is determined by reference to said look-up table.

5. A text processor according to claim 1, further comprising a look-up table, wherein said text generator generates text in accordance with said look-up table.

6. A text processor according to claim 5, wherein said look-up table is comprised by pre-designated text associated with text mark-up codes.

7. A text processor according to claim 6, wherein said table is further comprised by speech commands associated with text mark-up codes, said speech command generator generating speech commands in response to speech commands in the look-up table.

8. A text processor according to claim 5, wherein the look-up table is comprised by pre-designated text associated with punctuation and arithmetic symbols.

9. A text processor according to claim 8, wherein said table is further comprised by speech commands associated with punctuation and arithmetic symbols, said speech command generator generating speech commands in response to speech commands in the look-up table.

10. A text processor according to claim 5, wherein said look-up table is comprised by format templates.

11. A text processor according to claim 10, wherein said format templates further include embedded speech commands, said speech command generator generating speech commands based on said embedded speech commands.

12. A text processor according to claim 1, further comprising a look-up table, wherein the second characteristic is determined by reference to said look-up table.

13. A text processor according to claim 12, wherein said speech command generator generates speech commands in accordance with the look-up table.

14. A text processor according to claim 13, wherein said look-up table is comprised by speech commands associated with text mark-up codes.

15. A text processor according to claim 14, wherein said table is further comprised by pre-designated text associated with text mark-up codes, said text generator generating text in response to the pre-designated text in the look-up table.

16. A text processor according to claim 13, wherein the look-up table is comprised by speech commands associated with punctuation and arithmetic symbols.

17. A text processor according to claim 16, wherein said table is further comprised by pre-designated text associated with punctuation and arithmetic symbols, said text generator generating text in response to pre-designated text in the look-up table.

18. A text processor according to claim 13, wherein said look-up table is comprised by format templates.

19. A text processor according to claim 18, wherein said format templates include speech commands having embedded pre-designated text, said text generator generating text based on said embedded pre-designated text.

20. A text processor according to claim 1, further comprising a text-to-speech interface which receives spoken text parsed by said parser, text generated by said text generator, and speech commands generated by said speech command generator.

21. A text processor according to claim 20, wherein said text-to-speech interface is comprised by an output buffer for sequentially storing spoken text parsed by said parser, text generated by said text generator, and speech commands generated by said speech command generator.

22. A text processor according to claim 1, wherein the text stream is comprised by a stream of hexadecimal codes such as ASCII codes for each character in the text stream.

23. A text-to-speech processor comprising:

an input buffer for storing characters;

a text-to-speech interface for receiving a text stream and speech commands, whereby characters in the text stream may be converted into speech whose characteristics are controlled by the speech commands;

a parser including a pointer that points to characters in said input buffer, said parser for parsing characters at the pointer's position to detect unspoken characters and spoken characters, said parser sending spoken characters to said text-to-speech interface without altering the spoken characters;

a text generator for generating pre-designated text sequences in response to detection of unspoken characters having a first characteristic, for replacing, in the text stream, said unspoken characters having said first characteristic with said pre-designated text sequences, and for sending the generated text sequences to said text-to-speech interface;

means for updating the position of said pointer; and a speech command generator for generating speech commands in response to detection of unspoken characters having a second characteristic, and for sending the generated speech commands to said text-to-speech interface.

24. A text-to-speech processor according to claim 23, further comprising a look-up table, wherein the first characteristic is determined by reference to said look-up table.

25. A text-to-speech processor according to claim 24, wherein said text generator generates text in accordance with said look-up table.

26. A text-to-speech processor according to claim 25, wherein said look-up table is comprised by pre-designated text associated with text mark-up codes.

27. A text-to-speech processor according to claim 26, wherein said table is further comprised by speech commands associated with text mark-up codes, said speech command generator generating speech commands in response to speech commands in the look-up table.

28. A text-to-speech processor according to claim 25, wherein the look-up table is comprised by pre-designated text associated with punctuation and arithmetic symbols.

29. A text-to-speech processor according to claim 28, wherein said table is further comprised by speech commands associated with punctuation and arithmetic symbols, said speech command generator generating speech commands in response to speech commands in the look-up table.

30. A text-to-speech processor according to claim 25, wherein said look-up table is comprised by format templates.

31. A text-to-speech processor according to claim 30, wherein said format templates further include embedded speech commands, said speech command generator generating speech commands based on said embedded speech commands.

32. A text-to-speech processor according to claim 23, further comprising a look-up table, wherein said second characteristic is determined by reference to said look-up table.

33. A text-to-speech processor according to claim 32, wherein said speech command generator generates speech in accordance with the look-up table.

34. A text-to-speech processor according to claim 33, wherein said look-up table is comprised by speech commands associated with text mark-up codes.

35. A text-to-speech processor according to claim 34, wherein said table is further comprised by pre-designated text associated with text mark-up codes, said text generator generating text in response to the pre-designated text in the look-up table.

36. A text-to-speech processor according to claim 33, wherein the look-up table is comprised by speech commands associated with punctuation and arithmetic symbols.

37. A text-to-speech processor according to claim 36, wherein said table is further comprised by pre-designated text associated with punctuation and arithmetic symbols, said text generator generating text in response to pre-designated text in the look-up table.

38. A text-to-speech processor according to claim 33, wherein said look-up table is comprised by format templates.

39. A text-to-speech processor according to claim 38, wherein said format templates further include speech commands having embedded pre-designated text, said text generator generating text based on said embedded pre-designated text.

40. A text-to-speech processor according to claim 23, further comprising a look-up table of spoken characters, wherein said parser detects unspoken characters by reference to said look-up table of spoken characters.

41. A text-to-speech processor according to claim 23, further comprising a voice telephone interface for receiving speech generated by said text-to-speech converter and for putting the generated speech on a voice telephone line.

42. A text-to-speech processor according to claim 41, wherein said voice telephone interface includes a DTMF decoder for decoding DTMF text positioning commands.

43. A text-to-speech processor according to claim 42, wherein said parser repositions its pointer in said input buffer in accordance with the decoded positioning commands.

44. A text-to-speech processor according to claim 23, further comprising means for providing pointer positioning commands, wherein said parser repositions said pointer in said input buffer based on said positioning commands.

45. A text-to-speech processor according to claim 44, wherein said means for providing pointer positioning commands is a graphical user interface.

46. A text-to-speech processor according to claim 23, wherein the text stream is comprised by a stream of hexadecimal codes such as ASCII codes for each character in the text stream.

47. A text-to-speech processing apparatus comprising:
a processing unit including a computer for executing stored program process steps;
a memory for storing plural files which include text and for storing process steps for execution by said processing unit; and
a text-to-speech converter for converting characters in a text stream into speech and for executing speech commands;
wherein said process steps include steps
to select one of the data files stored in said memory,
to advance a pointer through the selected data file,
to parse characters at the pointer's position to detect in the text stream unspoken characters and spoken characters,
to feed the spoken characters to said text-to-speech converter,
to generate pre-designated text sequences in response to detection of unspoken characters,
to replace, within said text stream, said unspoken characters with said pre-designated text sequences,
to feed the replaced text stream to said text-to-speech converter,
to generate speech commands in response to detection of unspoken characters, and
to feed the generated speech commands to said text-to-speech converter for execution thereby,
whereby text in the selected data file is converted to speech.

48. A text-to-speech processing apparatus according to claim 47, further comprising interface means for accessing remote text files, wherein said process steps include process steps to store the remotely accessed text file in said memory.

49. A text-to-speech processing apparatus according to claim 48, wherein said interface means includes a LAN interface for accessing local area network files.

50. A text-to-speech processing apparatus according to claim 48, wherein said interface means includes a modem for downloading binary data files modulated on a voice telephone line.

51. A text-to-speech processing apparatus according to claim 48, wherein said interface means includes a facsimile interface, and wherein said process steps include process steps to perform optical character recognition on received facsimiles and to store resulting text into said memory.

52. A text-to-speech processing apparatus according to claim 47 further comprising a look-up table stored in said memory, wherein text is generated in accordance with said look-up table.

53. A text-to-speech processing apparatus according to claim 52, wherein said look-up table is comprised by pre-designated text associated with text mark-up codes.

54. A text-to-speech processing apparatus according to claim 53, wherein said table is further comprised by speech commands associated with text mark-up codes, wherein speech commands are generated in response to speech commands in the look-up table.

55. A text-to-speech processing apparatus according to claim 52, wherein the look-up table is comprised by pre-designated text associated with punctuation and arithmetic symbols.

56. A text-to-speech processing apparatus according to claim 55, wherein said table is further comprised by speech commands associated with punctuation and arithmetic symbols text mark-up codes, wherein speech commands are generated in response to speech commands in the look-up table.

57. A text-to-speech processing apparatus according to claim 52, wherein said look-up table is comprised by format templates.

58. A text-to-speech processing apparatus according to claim 57, wherein embedded speech commands are included in the text for said format templates, wherein speech commands are generated based on the embedded speech commands.

59. A text-to-speech processing apparatus according to claim 47, further comprising a look-up table stored in said memory, wherein said speech commands are generated in accordance with said look-up table.

60. A text-to-speech processing apparatus according to claim 59, wherein said look-up table is comprised by speech commands associated with text mark-up codes.

61. A text-to-speech processing apparatus according to claim 60, wherein said table is further comprised by pre-designated text associated with text mark-up codes, wherein speech commands are generated in response to speech commands in the look-up table.

62. A text-to-speech processing apparatus according to claim 59, wherein the look-up table is comprised by speech commands associated with punctuation and arithmetic symbols.

63. A text-to-speech processing apparatus according to claim 62, wherein said table is further comprised by pre-designated text associated with text mark-up codes, wherein text is generated in response to pre-designated text in the look-up table.

64. A text-to-speech processing apparatus according to claim 59, wherein said look-up table is comprised by format templates.

65. A text-to-speech processing apparatus according to claim 64, wherein said format templates further include speech commands having embedded pre-designated text, and wherein text is generated based on said embedded pre-designated text.

66. A text-to-speech processing apparatus according to claim 47, further comprising a look-up table of spoken characters, wherein unspoken characters are detected by reference to said look-up table.

67. A text-to-speech processing apparatus according to claim 47, further comprising a voice telephone interface for receiving speech generated by said text-to-speech converter and for putting the generated speech on a voice telephone line.

68. A text-to-speech processing apparatus according to claim 67, wherein said voice telephone interface includes a DTMF decoder for decoding DTMF text positioning commands.

69. A text-to-speech processing apparatus according to claim 68, wherein said decoder provides decoded positioning commands, and wherein said processing unit repositions said pointer in accordance with said decoded positioning commands.

70. A text-to-speech processing apparatus according to claim 69, wherein the process steps stored in said memory further include process steps to reposition the pointer based on said positioning commands.

71. A text-to-speech processing apparatus according to claim 70, further comprising a graphical user interface, wherein said positioning commands are provided by said graphical user interface.

72. A text-to-speech processing apparatus according to claim 47, wherein the text stream is comprised by a stream of hexadecimal codes such as ASCII codes for each character in the text stream.

73. A text processor for a text-to-speech converter comprising:

a parser for accepting a text stream, for parsing the text stream to detect a control character having a pre-defined characteristic, for parsing the text stream to detect spoken characters, and for not altering the spoken characters in the text stream;

a look-up table, said look-up table providing a pre-designated text sequence associated with said pre-defined characteristic, wherein said pre-defined characteristic is determined by reference to said look-up table; and a text generator, responsive to detection of said control character having the pre-defined characteristic, for generating said pre-designated text sequence, and for replacing, in the text stream, said control character having said pre-defined characteristic with said pre-designated text sequence.

74. A text processor according to claim 73, further including a speech command generator for generating pre-designated speech commands, said speech command generator being responsive to the detection of a control character having a second characteristic for generating said pre-designated speech commands.

75. A text processor according to claim 74, wherein said pre-defined characteristic corresponds to text mark-up codes, said look-up table being further comprised by speech commands associated with said text mark-up codes, said speech command generator generating said pre-designated speech commands in response to said speech commands in said look-up table.

76. A text processor according to claim 74, wherein said pre-defined characteristic corresponds to punctuation and arithmetic symbols, said look-up table being further comprised by speech commands associated with said symbols, and said speech command generator generating said pre-designated speech commands in response to said speech commands in said look-up table.

77. A text processor according to claim 74, wherein said second characteristic is determined by reference to a second look-up table.

78. A text processor according to claim 77, wherein said speech command generator generates said pre-designated speech commands in accordance with said second look-up table.

79. A text processor according to claim 73, wherein the text stream is comprised by a stream of hexadecimal codes such as ASCII codes for each character in the text stream.

80. Apparatus for converting text into speech comprising:

a memory for storing plural format templates, each of said plural format templates having both format data and at least one wild card field, said memory also storing pre-designated text which corresponds to format data for each format template;

a parser for parsing a text stream to determine whether a character string in the text stream matches one of the plural format templates, for parsing the text stream to detect spoken characters, and for not altering the spoken characters in the text stream;

a text generator responsive to a determination by said parser that a character string in the text stream matches one of the plural templates by replacing, the text stream, format data from the character string which matches format data from said one of the plural templates with corresponding pre-designated text, said text generator leaving unaltered text in the character string corresponding to each wild card field; and a text-to-speech converter for converting the text stream, including the replaced pre-designated text and the unaltered text, into speech.

81. Apparatus according to claim 80, further comprising a speech command generator, and wherein said memory also stores speech commands associated with said pre-designated text, said speech command generator generating pre-designated speech commands in response to a matching character string.

82. Apparatus according to claim 80, wherein the text stream is comprised by a stream of hexadecimal codes such as ASCII codes for each character in the text stream.

* * * * *